(12) United States Patent
Okazaki et al.

(10) Patent No.: US 7,050,573 B2
(45) Date of Patent: May 23, 2006

(54) METHOD OF GENERATING RING TONES USING MELODY AND COMMUNICATION TERMINAL APPARATUS

(75) Inventors: Shinji Okazaki, Kanagawa (JP); Katsumi Hirota, Kanagawa (JP)

(73) Assignee: Sony Corporation (JP)

( * ) Notice: Subject to any disclaimer, the term of this patent is extended or adjusted under 35 U.S.C. 154(b) by 528 days.

(21) Appl. No.: 09/861,789

(22) Filed: May 21, 2001

(65) Prior Publication Data

US 2002/0018556 A1   Feb. 14, 2002

(30) Foreign Application Priority Data

May 23, 2000   (JP)   ............................ P2000-152016

(51) Int. Cl.
    *H04M 1/00*    (2006.01)
    *H04M 3/00*    (2006.01)

(52) U.S. Cl. ........................... 379/373.02; 379/373.01; 379/373.03; 379/373.04; 379/374.01; 379/374.02; 88/600; 88/627

(58) Field of Classification Search ........... 379/379.01, 379/372–378, 418; 88/600–608
See application file for complete search history.

(56) References Cited

U.S. PATENT DOCUMENTS

| | | | | |
|---|---|---|---|---|
| 5,636,270 A | * | 6/1997 | Davey ................... | 379/374.01 |
| 6,047,073 A | * | 4/2000 | Norris et al. ................. | 84/630 |
| 6,094,587 A | * | 7/2000 | Armanto et al. ....... | 379/374.01 |
| 6,192,340 B1 | * | 2/2001 | Abecassis ................... | 704/270 |
| 6,266,271 B1 | * | 7/2001 | Kawamura ............. | 365/185.04 |
| 6,418,330 B1 | * | 7/2002 | Lee ............................ | 455/567 |
| 2001/0024965 A1 | * | 9/2001 | Hayashi ..................... | 455/567 |
| 2003/0013432 A1 | * | 1/2003 | Fukaya ....................... | 455/412 |

* cited by examiner

*Primary Examiner*—Sinh Tran
*Assistant Examiner*—Ramnandan Singh
(74) *Attorney, Agent, or Firm*—Lerner, David, Littenberg, Krumholz & Mentlik, LLP

(57) ABSTRACT

In a communication terminal apparatus such as a portable telephone, it is made possible to sound ring tones of good tone quality simply by using arbitrary music or the like. In a communication terminal that conducts radio communication with a predetermined station and incorporates a music or speech data reproduction function, ring tones according to selected data included in previously prepared data for ring tones is outputted in response to an incoming call when a first mode has been set, whereas ring tones according to data of a previously set section included in music or speech data stored in a reproduction function section is outputted, in response to an incoming call when a second mode has been set.

5 Claims, 6 Drawing Sheets

METHOD OF GENERATING RING TONES USING MELODY AND COMMUNICATION TERMINAL APPARATUS

BACKGROUND OF THE INVENTION

1. Field of the Invention

The present invention relates to a ring tones output method and a communication terminal apparatus suitable for application to, for example, a radio telephone apparatus called portable telephone terminal. In particular, the present invention relates to a ring tones output method of a communication terminal that has a music reproduction function of reproducing predetermined audio data and that reproduces the audio data as a ring tones in the telephone function.

2. Description of the Related Art

Heretofore, there have been conducts various attempts to combine a communication terminal apparatus used as a radio telephone apparatus with a different function to form a composite terminal. In other words, radio telephone apparatuses are formed so as to be small-sized for example use and always carried by the user. Besides the function as a radio telephone, therefore, some radio telephone apparatuses have a watch function, a schedule managing function, and the like, and conducts display on a display device included therein.

As a further sophisticated composite terminal, it is proposed to incorporate an audio reproduction device in a portable terminal apparatus. With a capacity increase of semiconductor memories and improvement of the audio data compression technique in recent years, it has become possible to store audio data of, for example, approximately several tens minutes to several hours in a memory incorporated in a memory card. There has already been put into practical such a portable terminal apparatus that a headphone is attached to a small-sized reproduction device using this memory card as a recording medium (storage medium) and an audio signal can be heard on the headphone.

Such an audio reproduction device using such a memory as a recording medium is incorporated in a portable telephone terminal. When the portable telephone terminal is not used for talking, therefore, the audio signal can be heard by attaching a headphone to the terminal. Application of portable telephone terminals is thus widened.

Furthermore, by attaching an audio reproduction device to a portable telephone terminal, thereby downloading audio data from a center to the terminal via, for example, a radio telephone line, and storing the audio data in a memory card attached to the terminal, the audio data can be simply downloaded to the user. It is very convenient.

By the way, the above described portable telephone terminal is adapted to sound a ring tones at the time of call incoming as a telephone. As this ring tones, a melody of a short time of approximately several seconds to 10 seconds can be sounded as an electronic tone, besides an electronic tone that simply peeps. As the cases where such a melody is sounded, there are the case where a desired melody is selected from among melodies previously stored in an internal memory at the time of fabrication of the terminal, the case where the user inputs a desired melody by means of key operation, the case where the user accesses a server having melodies for ring tones prepared therein, via a telephone line, downloads data of the desired melody from the server, and stores the data in the terminal.

By sounding an electronic tone of such a melody, terminals used by individuals can be distinguished. For example, it becomes easy to know whose terminal a call has arrived at. Herein, a call tone sounded by a terminal at the time of call incoming is referred to as ring tones.

In the case where a melody previously prepared in an internal memory of a terminal is sounded, however, there is a problem that melody kinds are restricted to those previously prepared. Also in the case where data of a desired melody is downloaded from the server, there is a problem that only melodies prepared on the server side can be set. In the case where a melody is inputted by key operation, there is a problem that complicated key operation conforming to musical intervals of the melody becomes necessary.

Furthermore, as for the conventional ring tones of a melody, an electronic tone of a predetermined musical interval is generated in the terminal on the basis of data of the melody and the melody is outputted. In some terminals, a complex tone such as a double tone can be generated. Basically, however, the electronic tone is an electric composite tone, resulting in a problem that a change in tone quality is poor.

SUMMARY OF THE INVENTION

An object of the present invention is to sound a ring tones of good tone quality simply by arbitrary music or the like in such a communication terminal apparatus.

In accordance with the present invention, a communication terminal that conducts radio communication with a predetermined station and incorporates a music or speech data reproduction function outputs a ring tones according to selected data included in previously prepared data for ring tones in response to call incoming, when a first mode has been set. When a second mode has been set, the communication terminal outputs a ring tones according to data of a previously set section included in music or speech data stored in a reproduction function section, in response to call incoming.

By doing this, it becomes possible to sound a ring tones by utilizing reproduction a music or speech data reproduction function.

DETAILED DESCRIPTION OF THE PREFERRED EMBODIMENTS

Hereafter, an embodiment of the present invention will be described by referring to accompanying drawing.

In the present example, the present invention is applied to a radio telephone apparatus (portable telephone terminal) for conducting talking and data communication by, for example, transmitting digital data of various systems between the portable telephone terminal and a base station. Besides a function section serving as a radio telephone, an audio reproduction function section is incorporated in the portable telephone terminal of the present example.

Figure 1:
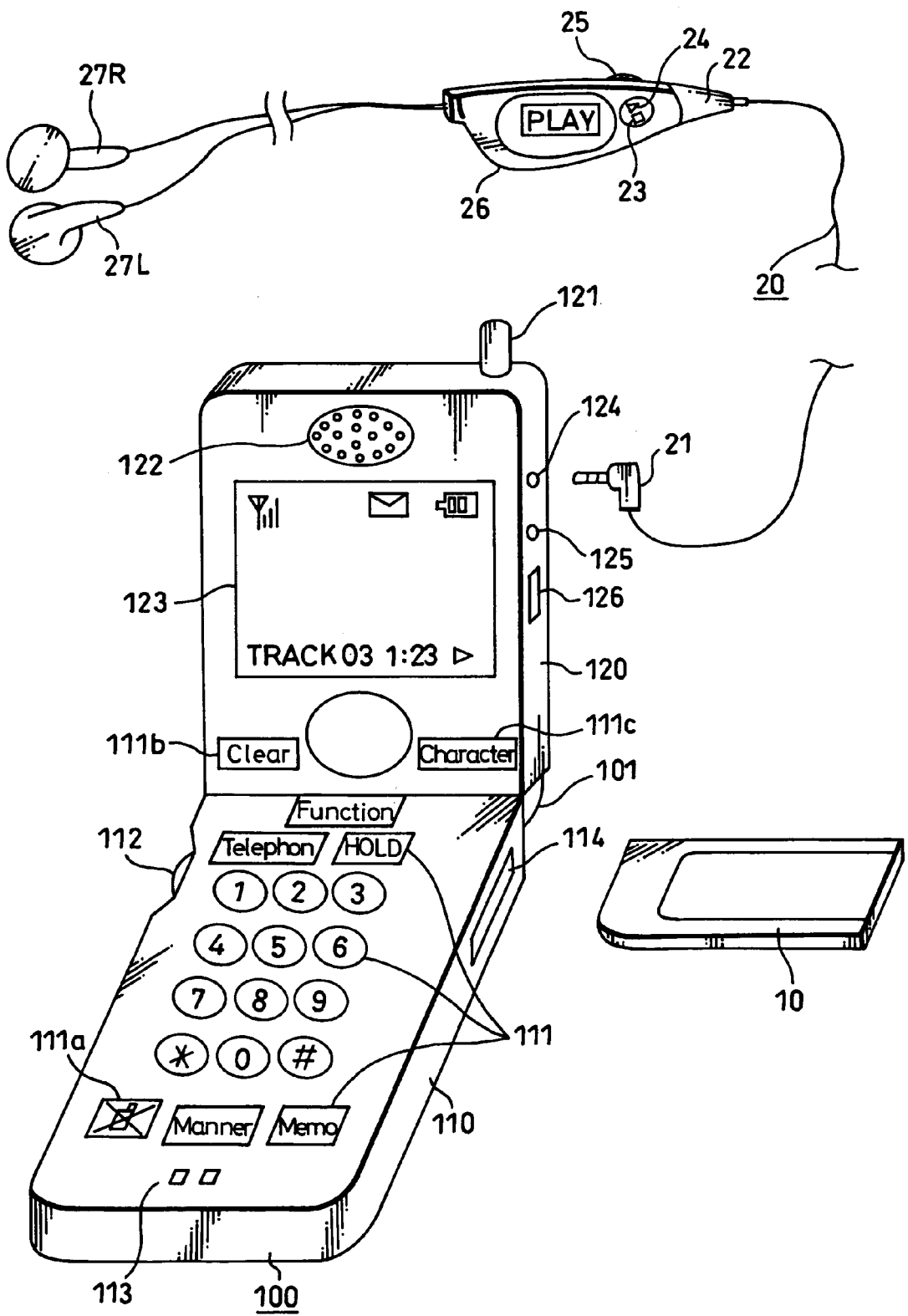
FIG. 1 is an oblique view showing an example (opened state) of a terminal apparatus according to an embodiment of the present invention.

FIG. 1 is a diagram showing an example of an exterior view of a portable telephone terminal 100 of the present example. A portable telephone terminal 100 of the present example is formed as a portable telephone terminal of the so-called folding type. A first casing 110 and a second casing 120 are joined in a joining section 101 so as to be rotatable. FIG. 1 shows such a state that the casings 110 and 120 are opened. On a surface of the first casing 110 that becomes the inside when the portable telephone terminal is opened, a key input section 111 including a plurality of keys used as a telephone is disposed. In the key input section 111, numeral keys 0 to 9, * and # symbol keys, a key for conducting call origination, and keys for setting various functions are prepared. One key 111a of the function keys serves as a key for stopping the telephone function and setting and releasing such a mode as to activate only the audio reproduction function.

Some keys 111b and 111c are disposed on the second casing 120 side. Furthermore, on the side surface of the first casing 110, a jog dial section 112 allowing rotation operation and depression operation is disposed. Also by operating the jog dial section 112, various operations can be conducted. By operating the jog dial section 112, operation of the audio reproduction function can also be conducted.

On the bottom end of the first casing 110, a microphone 113 for talking is disposed. On the top end of the second casing 120, a speaker 122 for talking is disposed. By bringing the microphone 113 and the speaker 122 close to the mouth and ear of the talker, respectively, talking can be conducted. On the central portion of the second casing 120, a display panel forming a display section 123 is disposed. Various kinds of information concerning the telephone, such as the operation state, a registered telephone number, or received character mail, can be displayed by using numerals, characters or figures. Furthermore, information concerning an audio reproduction function described later can also be displayed.

A memory card attaching section 114 is provided in the first casing 110. For example, from the side surface side of the casing, a memory card 10 can be inserted and attached. In the case of the present example, a non-volatile semiconductor memory that is housed in a resin package formed so as to take the shape of, for example, a stick (a slender thin plate) is used as the usable memory card 10.

A whip antenna 121 is attached to the top end of the second casing 120. Various terminals are disposed on the side surface section of the second casing 120. To be concrete, a headphone jack 124, an audio input jack 125, and a data communication port 126 are disposed on the side surface section of the second casing 120. As for the headphone jack 124, an output section of an audio signal (speech signal) supplied to a headphone device, an input section of a speech signal picked up by a microphone incorporated in the headphone device, and an input-output section for conducting communication with a remote control device attached to the headphone device are formed as one body. The data communication port 126 is a port for connection to, for example, a personal computer device or the like. As the data communication port 126, for example, an interface port conforming to standards called USB (Universal Serial Bus) or an interface port conforming to IEEE (The Institute of Electrical and Electronics Engineers) 1394 standards is used.

As for a headphone device 20 having a plug 121 to be attached to the headphone jack 124, a remote control section 22 is attached in the middle of a signal line thereof. The remote control section 22 has a display section 23, a key 24, a volume, and a microphone 26 attached thereto. The signal line has left and right headphone units 27L and 27R attached to a tip portion thereof.

Figure 2:
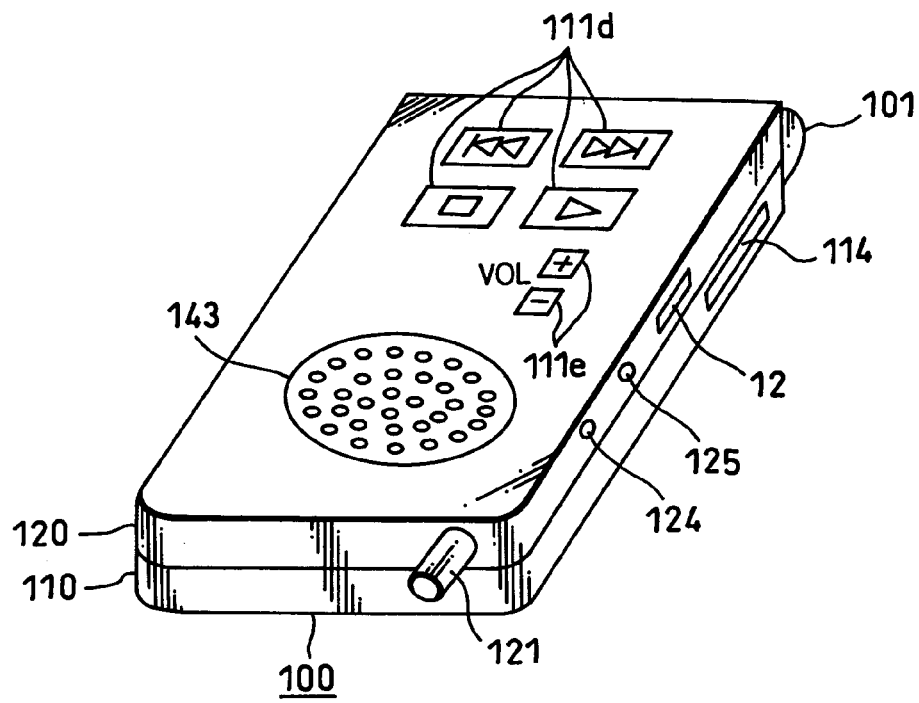
FIG. 2 is an oblique view showing an example of an obverse in such a state that the terminal apparatus of the example shown in FIG. 1 is closed.

FIG. 2 is a diagram showing an obverse side (i.e., a surface of the second casing 120 side) in such a state that the portable telephone terminal 100 of the present example is closed. On this surface, a plurality of keys 111d for conducting audio reproduction operation, and volume keys 111e for adjusting the reproduced sound volume are disposed. In addition, a speaker 143 for outputting the reproduced audio signal is disposed. This speaker 143 is used also for sounding the ring tones of the telephone at the time of call incoming.

Figure 3:
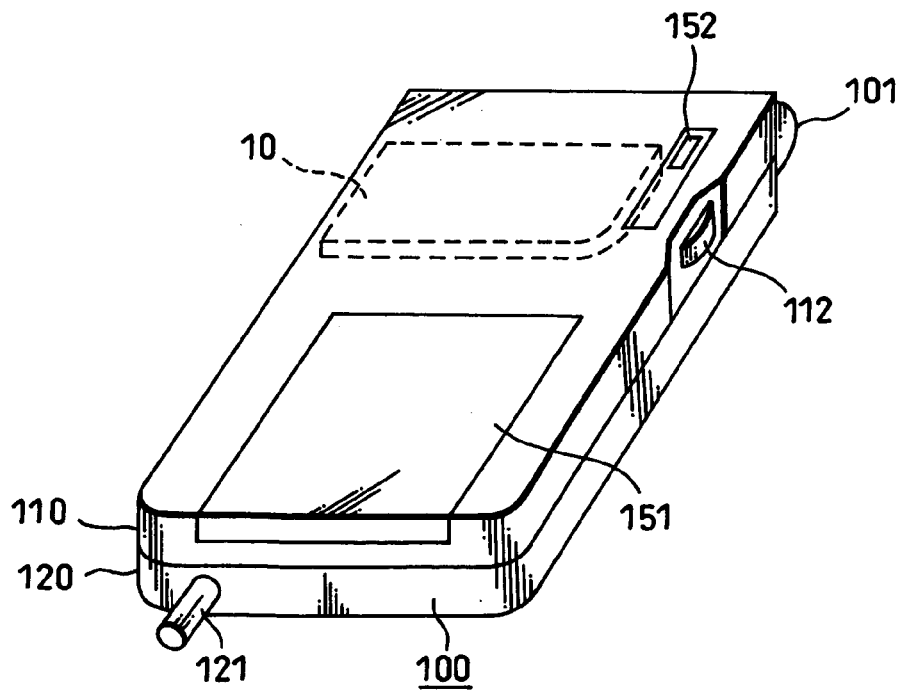
FIG. 3 is an oblique view showing an example of a reverse in such a state that the terminal apparatus of the example shown in FIG. 1 is closed.

FIG. 3 is a diagram showing the reverse side (i.e., the surface of the first casing 110 side) in such a state that the portable telephone terminal 100 of the present example is closed. On this side, a battery (secondary battery) attaching section 151 is disposed, and in addition, a reject switch 152 for detaching the memory card 10 attached to the battery attaching section 114 is disposed.

The internal configuration of the portable telephone terminal 100 of the present example will now be described by referring to FIG. 4. As circuits for radio telephone, a reception circuit 132 and a transmission circuit 134 are connected to an antenna 121 via an antenna sharing device 131. In the reception circuit 132, reception processing of an ordered channel is conducted. A signal received by the reception circuit 132 is supplied to a speech processing section 133. The speech signal and various data that have been radio-transmitted are demodulated and extracted. The demodulated speech signal is outputted from the speaker 122. Furthermore, a speech signal outputted by the microphone 113 is supplied to the speech processing section 133 and subjected therein to modulation for radio transmission. The processed signal is subjected in the transmission circuit 134 to transmission processing for producing a transmission signal of a predetermined channel. The transmission signal is radio-transmitted from the antenna 121. The processing in the speech processing section 133, the reception circuit 132, and the transmission circuit 134 is executed under the control of a central control unit (CPU) 135. The CPU 135 is a microprocessor for controlling various kinds of signal processing in this portable telephone terminal. The CPU 135 controls the audio reproduction function as well.

A call incoming detection circuit 132a is connected to the reception circuit 132. On the basis of a control signal received from a base station by the reception circuit 132, call incoming to the terminal 100 is detected by the call incoming detection circuit 132a. Upon detecting call incoming, the call incoming detection circuit 132a supplies call incoming detection information to the CPU 135, and executes processing required by the CPU 135. As the processing required by the CPU 135, there is, for example, processing of sounding a call incoming tone. Details of the processing of sounding the call incoming tone will be described later.

A ROM 136 storing information required for the operation of the terminal and a RAM 137 storing information registered by the user, such as telephone directory information, are connected to the CPU 135. The CPU 135 reads out stored information as occasion demands. In this case, a flash memory, in which a part of stored data can be rewritten when predetermined processing has been conducted, is used as the ROM 136. Registration information concerning the telephone function is written into the ROM 136. As registration information concerning the telephone function stored in the ROM 136, there are ID data that is an identification number peculiar to the telephone terminal, information as to whether there is a contract with a radio telephone company, and information of a telephone number given by the telephone company when there is a contract. Furthermore, in the case where a contract concerning the audio reproduction function is necessary, information concerning the contract may be written into the ROM 136.

Furthermore, a partial area of the ROM 136 is set as a storage section of data of the ring tones. Upon call incoming to the terminal, preselected data included in data of the ring tones stored in the area is read out and the ring tones is sounded as an electronic tone from the speaker 122 (or a speaker that is dedicated to the ring tones and that is not illustrated) under the control of the CPU 135. Furthermore, in the present example, processing of sounding the ring tones by utilizing the audio reproduction function described later can be executed, besides the processing of sounding the electronic tone as the ring tones. There are the case (first mode) where an electronic sound is sounded as the ring tones and the case (second mode) where the ring tones is sounded by utilizing the audio reproduction function. By operating the key input section 111 or the jog dial section 112 and thereby conducting mode setting, either mode can be registered in the CPU 135 and selected.

Information obtained by operating the key input section 111 or the jog dial section 112 is supplied to the CPU 135. The CPU 135 executes operation based on the operation information. The CPU 135 controls display on the display section 123 as well.

The configuration described heretofore is basically a configuration relating to the telephone function.

The configuration concerning the audio reproduction function will now be described. In the case of the present example, data obtained by compressing audio data by using a predetermined system (for example, the ATRACK3 system) is stored in the memory card 10. When the memory card 10 having the audio data stored thereon is attached to the memory card attaching section 114, data stored in the memory card 10 is supplied to a decoder 138 under the control of the CPU 135. In the decoder 138, the compressed data is subjected to inverse compression processing to restore the original data. The restored data is supplied to a digital-to-analog converter 139 to obtain an analog audio signal. The converted audio signal is supplied to an output terminal 124a. The output terminal 124a is a terminal disposed within the headphone jack 124.

An output of the digital-to-analog converter 139 and an output of the speech processing section 133 for talking speech are added in an adder 140 and a resultant sum is supplied to the output terminal 124a. When the terminal is used as a telephone terminal and talking is conducted, it is also possible to listen to the talking speech by using the headphone device 20. And the audio signal is supplied to the headphone device connected to the output terminal 124a. By the way, the output of the digital-to-analog converter 139 is subjected to analog signal processing such as amplification in some cases.

Furthermore, it is also made possible to supply the audio signal outputted by the digital-to-analog converter 139 to the speaker 143, which is attached to the obverse of the terminal, via an amplifier 142 and output the audio signal from the speaker 143. The selection of an output system of the digital-to-analog converter 139 is controlled by the CPU 135. Furthermore, also in the case where the ring tones is sounded by utilizing the audio reproduction function as described later, audio data of a previously registered section is read out from the memory card 10 as the ring tones, and an audio signal outputted from the digital-to-analog converter 139 is supplied to the speaker 143, which is attached to the obverse of the terminal, and the ring tones is sounded in the speaker 143.

The audio reproduction function section of the present example has also the function of recording (storing) an inputted audio signal (or speech signal) in the attached memory card 10. For this recording function, the digital audio data input terminal 125 is provided, and audio data obtained at the input terminal 125 is supplied to the decoder 138. The decoder 138 of the present example is made capable of functioning as an encoder for encoding input data for the purpose of recording. Encoded data is stored in the memory card 10 attached to the memory card attaching section 114 under the control of the CPU 135. By the way, as for the decode processing and encode processing in the decoder 138, processing of a system suitable to process audio data such as music is conducted here.

Figure 4:
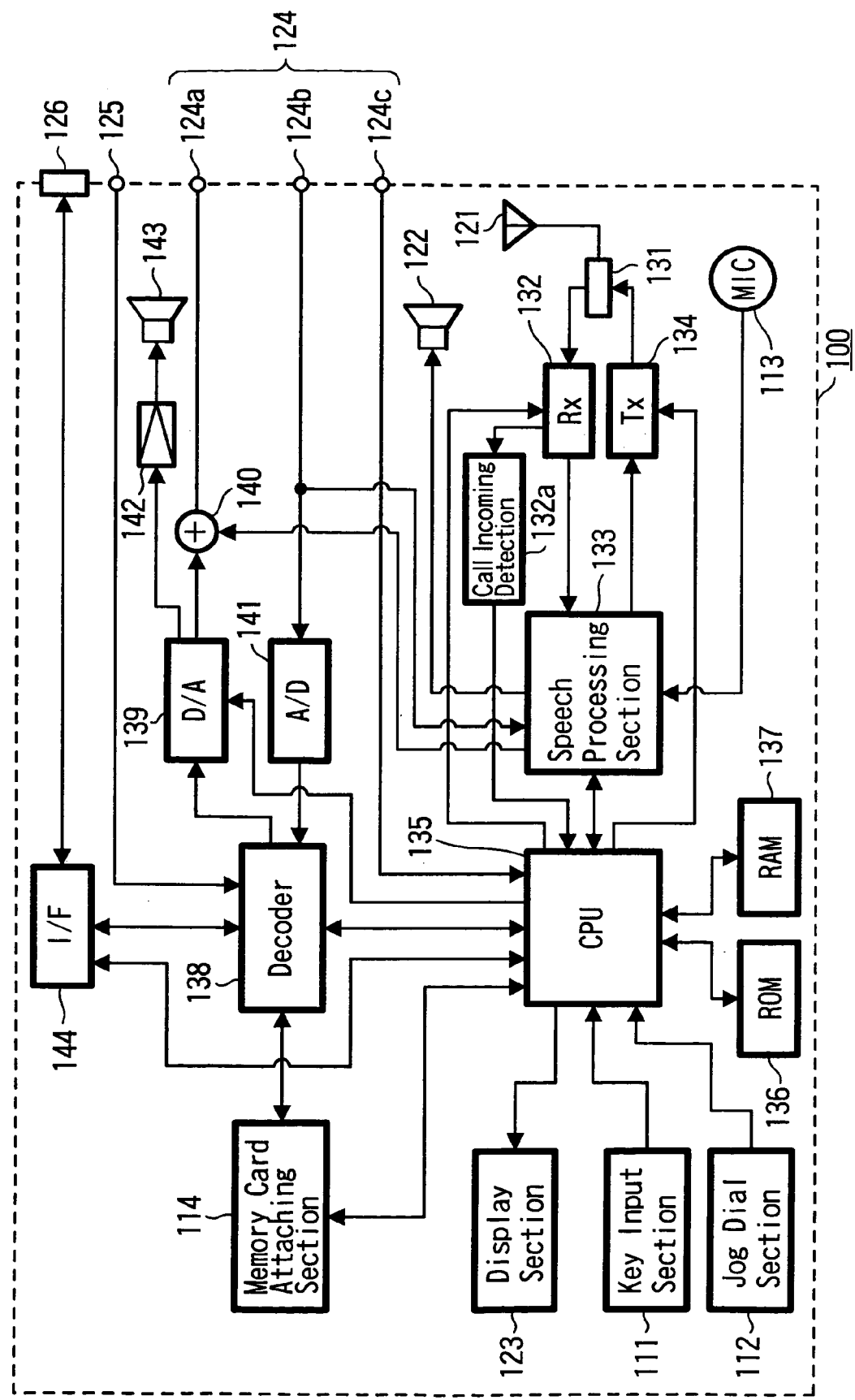
FIG. 4 is a block diagram showing an example of an internal configuration of a terminal apparatus according to an embodiment of the present invention.

The head phone jack 124 shown in FIG. 1 includes an input terminal 124b of a speech signal supplied from the microphone incorporated in the headphone, and an input-output terminal 124c for remote control, besides the output terminal 124a as shown in FIG. 4. The speech signal obtained at the input terminal 124b is supplied to the decoder 138 via an analog-to-digital converter 141. In the same way as the case of audio data, the speech signal can be encoded and stored in the memory card 10. Furthermore, the speech signal supplied from the microphone and obtained at the input terminal 124b can be supplied to the speech processing section 133 and processed as talking speech in the same way as the speech inputted from the microphone 113. The input-output terminal 124c for remote control is a terminal used by the CPU 135 to conduct communication with the remote control section 22 included in the headphone device 20. The CPU 135 controls display in the display section 23 included in the remote control section 22. In addition, the CPU 135 judges the operation information of the key 24. By the way, it is also possible to superpose the remote control signal on the audio signal (speech signal) and make the remote control input-output terminal 124c common to the output terminal 124a.

The portable telephone terminal 100 of the present example includes the data communication port 126 for conducting communication with an information device such as a personal computer device. An interface section 144 is connected to the data communication port 126. Via the interface section 144, the CPU 135 and the decoder 138 can communicate with a device of the other party connected to the data communication port 126. In communication with an external device using the data communication port 126, for example, audio data supplied to the data communication port 126 from an external device can be supplied to the decoder 138, compressed for recording (storing), and stored in the memory card 10 attached to the memory card attaching section 114, or audio data stored in the memory card 10 can be de-compressed, and supplied to a device connected to the data communication port 126. Furthermore, data received by this terminal via a radio telephone line can also be supplied to the data communication port 126 under the control of the CPU 135 and supplied to an external device, or on the contrary, data supplied from an external device to the data communication port 126 can also be sent out to the radio telephone line side under the control of the CPU 135.

Furthermore, various data, such as audio data, received by the reception circuit 132 of this terminal via a radio telephone line can also be stored in the memory card 114 under the control of the CPU 135. If in this case the received data is data already encoded for storage, then data may be written in the memory by omitting encoding processing in the decoder 138.

A function section for recording (storing) and reproducing audio data and speech data is thus incorporated in the portable telephone terminal of the present example. By the way, in the case of the present example, the memory card 10 can be freely attached to and detached from the memory card attaching section 114. Therefore, it is also possible to attach the memory card 10 that has stored audio data in, for example, a different audio device to the portable telephone terminal 100 of the present example and reproduce the audio data.

The processing of sounding the ring tones at the time of call incoming in the portable telephone terminal of the present example will now be described by referring to flow charts of FIGS. 5 and 6. In the case of the present example, the so-called ordinary ring tones processing (first mode) of sounding an electronic tone as the ring tones and the processing (second mode) of sounding the ring tones by utilizing the audio reproduction function can be executed as already described. In the case where the ring tones is sounded by utilizing the audio reproduction function in the second mode, it is necessary to previously conduct setting processing of registering a section where the ring tones is sounded.

Figure 5:
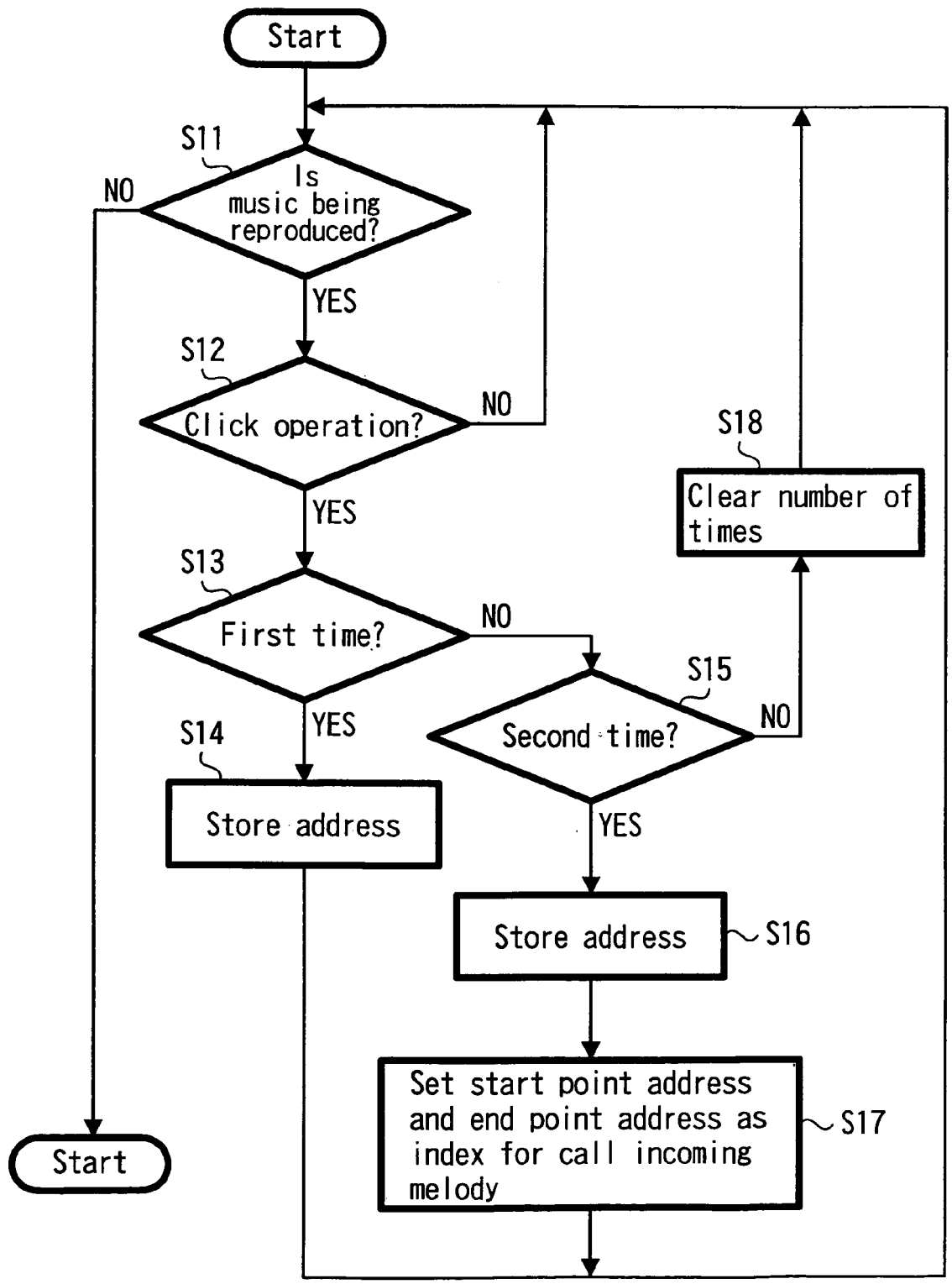
FIG. 5 is a flow chart showing an example of registration processing of a ring tones according to an embodiment of the present invention.

FIG. 5 shows an example of this registration processing. First, the audio signal (music or speech) stored in the memory card 10 is reproduced, and the reproduced tone is outputted from the speaker or the headphone. A ring tones registration mode is set by some key operation. Reproduction of the music may be conducted after setting the ring tones registration mode.

And the CPU 135 determines whether the music is being reproduced (step S11). Unless the music is being reproduced, the registration processing is interrupted. When the reproduction is judged to be on the way, then it is determined whether click operation of depressing the jog dial section 112 has been conducted (step S12). Unless the click operation has been conducted, it is determined whether the click operation is conducted so long as the reproduction is continued.

If click operation is judged at the step S12 to have been conducted, then it is determined whether the click operation is operation of a first time (step S13). If the operation is operation of the first time, then the storage address, on the memory, of the audio data read out from the memory card 10 and reproduced is temporarily stored in the CPU 135 as a start point address (step S14). After the audio data is temporarily stored, the processing returns to the decision of the step S11.

Unless the click operation is judged at the step S12 to have been conducted and the click operation is judged at the step S13 to be click operation of the first time, then it is determined whether the click operation is click operation of a second time (step S15). If the click operation is judged at the step S15 to be click operation of the second time, then the storage address, on the memory, of the audio data read out from the memory card 10 and reproduced at that time is temporarily stored in the CPU 135 as an end point address (step S16). The start point address and the end point address temporarily stored in the CPU 135 are stored in a memory connected to the CPU 135 as an index for call in coming melody (step S17). At the time of this storage, data required to discriminate the musical composition (such as music) reproduced at this time or the memory card 10 is also stored.

Furthermore, unless the click operation is judged at the step S15 to be click operation of the second time, setting of the number of times of click operation within the CPU 135 is cleared (step S18).

By thus conducting processing, it becomes possible to reproduce the music read out from the memory card 10 by utilizing the audio reproduction function section and register an arbitrary section within the reproduced music as the ring tones. In other words, when the click operation of depressing the jog dial section 112 is conducted for the first time, the place that is being reproduced is registered as the head position of the ring tones. When click operation is conducted the next time, the place that is being reproduced is registered as the end position of the ring tones. By user operation, therefore, it becomes possible to register an arbitrary section in the music as the ring tones. By the way, a limit may be previously provided as to the registered length (time) of music (speech).

Processing of outputting the ring tones thus registered, at the time of call incoming will now be described by referring to a flow chart of FIG. 6. Processing of outputting the ring tones at the time of call incoming is executed under the control of the CPU 135. The CPU 135 determines whether call incoming has been detected by the call incoming detection circuit 132a (step S21), and waits until call incoming is detected. If call incoming is detected at the step S21, then the CPU 135 determines whether there is a registered index for call incoming melody (step S22).

If it is judged that there is no registered index for call incoming melody, the processing proceeds to the processing of sounding an ordinary ring tones. In other words, it is determined whether off-hook operation has been conducted (step S23). If off-hook operation is not detected, data of the electronic tone serving as the ring tones is read out (step S24). The electronic tone according to the data is sounded as the ring tones (step S25). And it is determined whether call incoming is continuing (step S26). When the call incoming state is judged to have ended, sounding of the ring tones is stopped (step S27). Processing returns to the decision of the step S21, and a call incoming wait state is brought about.

If the call incoming is judged to be continuing at the step S26, then the processing returns to the decision of the off-hook operation of the step S23. If off-hook operation is judged at the step S23 to have been conducted, then sounding of the ring tones is stopped (step S28), a shift to a talking state is conducted (step S29), and it is determined whether talking is finished, i.e., on-hook is detected (step S30). If on-hook is detected, then the processing returns to the decision of the step S21 and the call incoming wait state is brought about.

If it is judged at the step S22 that there is a registered index for call incoming melody, then the processing proceeds to the processing of sounding the ring tones by utilizing the audio reproduction function. At this time, it is judged whether off-hook operation has been conducted (step S31). Unless off-hook operation has been detected, audio data of the section having a call incoming melody index registered therefor is read out from the memory card 10 (step S32). The audio data is subjected to reproduction processing and outputted from the speaker 143, and sounded as the ring tones (step S33). In the case where the audio data is sounded as the ring tones, the audio data of the section having a call incoming melody index registered therefor is read out repeatedly. In that case, a time of approximately one second may be left between reproduction of one time and the next reproduction. And it is determined whether call incoming is continuing (step S34). If the call incoming state is judged to have been finished, then sounding of the ring tones is stopped (step S35), processing returns to the decision of the step S21, and the call incoming waiting state is brought about.

If call incoming is judged at the step S34 to be continuing, then processing returns to the decision of the off-hook operation of the step S31. If off-hook operation is judged at the step S31 to have been conducted, then sounding of the ring tones is stopped (step S28), a shift to the talking state is conducted (step S29), and it is determined whether talking is finished, i.e., on-hook is detected (step S30). If on-hook is detected, then the processing returns to the decision of the step S21 and the call incoming wait state is brought about.

In this way, the ring tones is sounded by utilizing the audio reproduction function and the audio data stored in the memory card 10. As a result, it becomes possible for the user to sound a desired musical composition with a high tone quality similar to that of the case where audio reproduction is conducted.

In the processing described heretofore, the audio data of the pertinent section is read out from the memory card 10 at the time of call incoming and the ring tones is generated from the data read out, as the processing of sounding the ring tones by utilizing the audio reproduction function. Alternatively, at the time point when there has been registration of an index for call incoming melody at the step S17 in the flow chart of FIG. 5, the audio data of the pertinent section may be read out from the memory card 10 and stored in a memory connected to the CPU 135.

Figure 7:
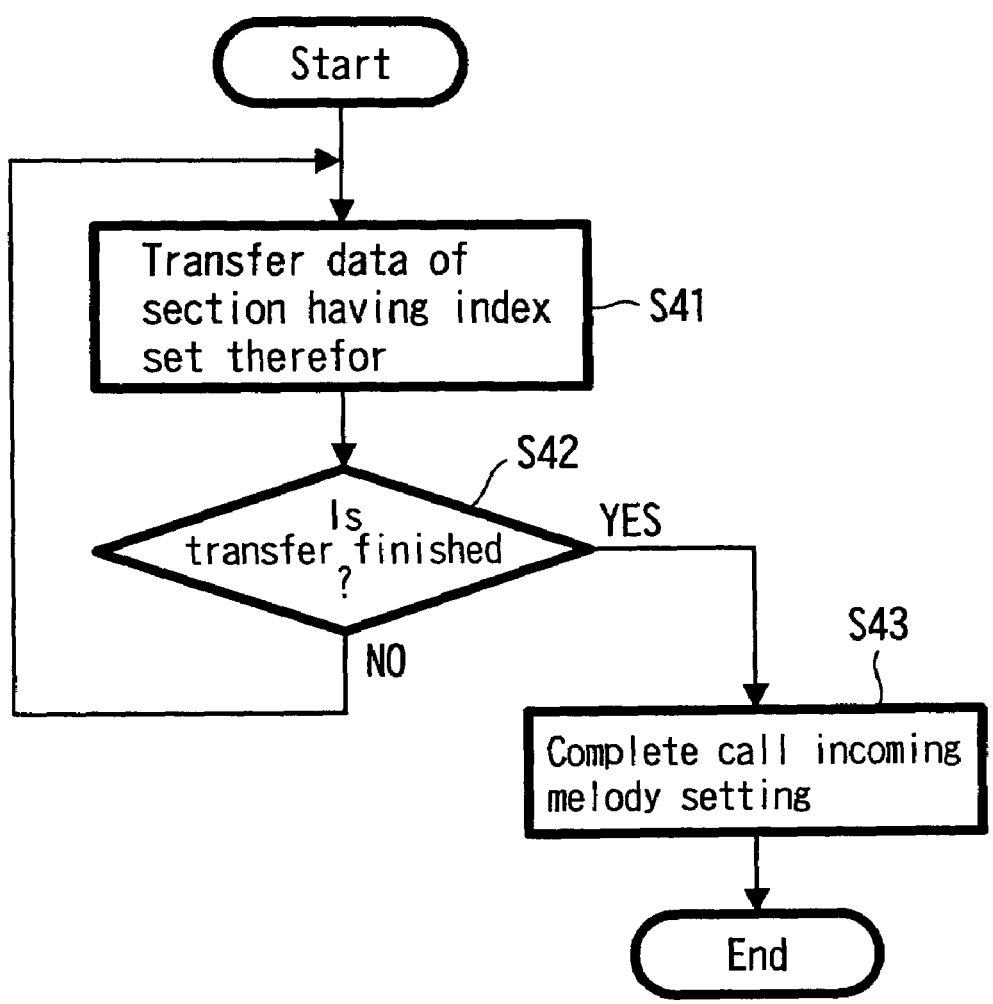
FIG. 7 is a flow chart showing an example of transfer processing of data of a ring tones according to another embodiment of the present invention.

In other words, for example, as shown in a flow chart of FIG. 7, the audio data of the section having an index set therefor is transferred to the RAM 137 connected to the CPU 135 (step S41), and it is determined whether the transfer work has finished (step S42). If the transfer work has finished, setting of the call incoming melody is completed (step S43). In the case where such a mode that the ring tones is sounded by utilizing the audio reproduction function is set, the audio data transferred to the RAM 137 is read out and the audio data thus read out is reproduced to sound the ring tones. By doing so, it becomes possible to sound the musical composition at the time of registration, as the ring tones, even if, for example, a different musical composition is stored in the memory card 10 afterwards or the memory card itself is removed from the terminal.

In the case where the audio data is read out from the memory card 10 and transferred to and stored in a different memory as shown in the flow chart of FIG. 7, the audio data may be subjected to some system conversion processing. For example, audio data stored in the memory card 10 by using the ATRACK 3 system may be stored in the RAM or the like as audio data coded by using a different compression system.

Figure 6:
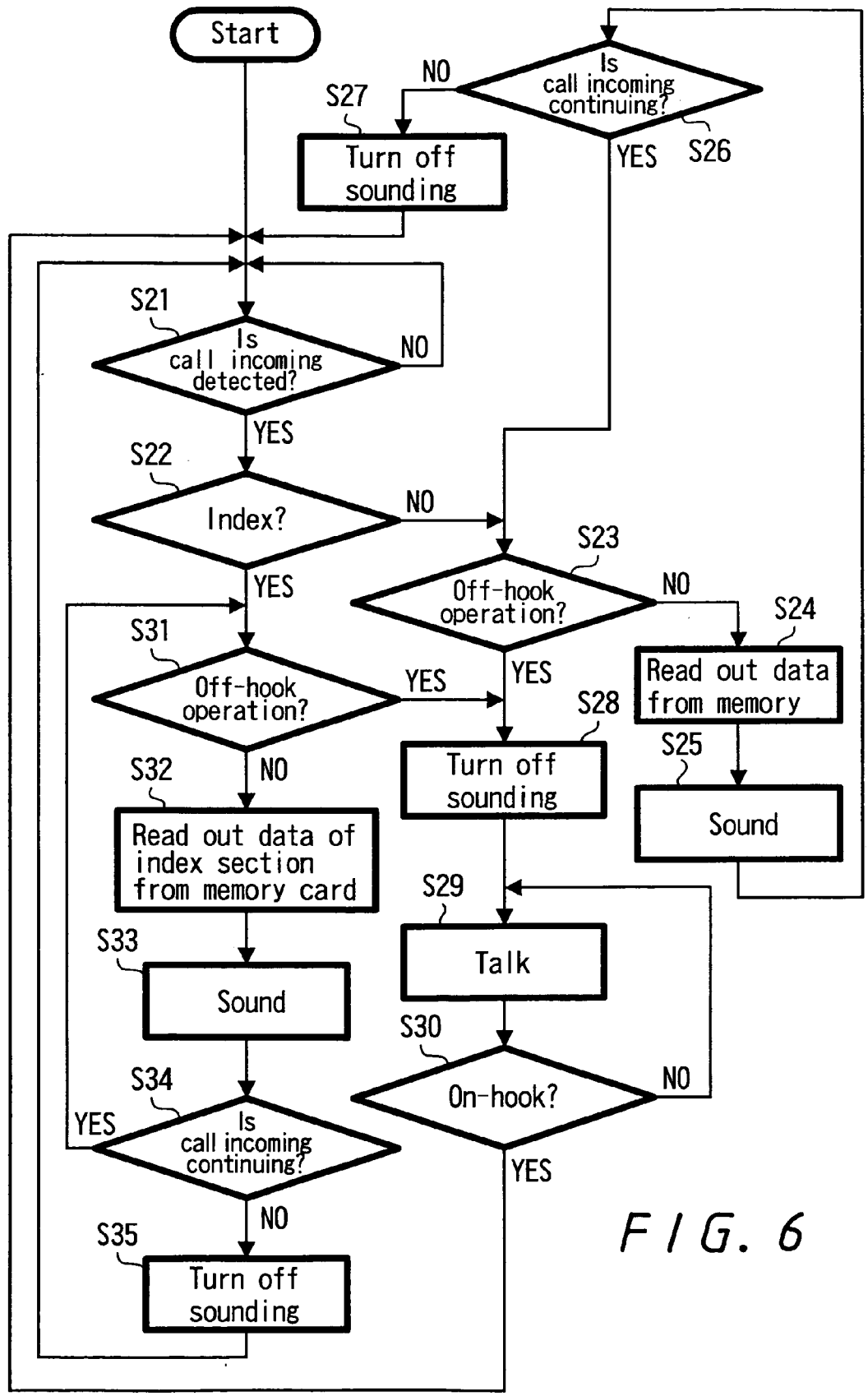
FIG. 6 is a flow chart showing an example of processing of sounding a ring tones according to an embodiment of the present invention.

In the processing shown in the flow charts of FIGS. 5 and 6, such a mode (the second mode) that the ring tones is sounded by utilizing the audio reproduction function is automatically set when there is registration of an index for call incoming melody, whereas the processing (the first mode) of sounding the ring tones by using an ordinary electronic tone is set when there is no registration of an index for call incoming melody. Apart from whether there is registration of an index for call incoming melody, however, the first or second mode may be set by user operation. In other words, even if an index for call incoming melody is registered, the ring tones using an ordinary electronic tone may be sounded by setting the first mode. In this case, the second mode can be automatically changed to the first mode, in the case where there is no registration of an index for call incoming melody, in the case where data of the musical composition is erased from the memory card 10 even if there is registration of an index, or in the case where the memory card 10 is removed from the terminal 100.

In the description given heretofore, audio data is recorded (stored) in the attached memory card and the recorded audio data is reproduced. Alternatively, it is possible to form such a speech recording and reproducing apparatus that speech data picked up by the microphone incorporated in the portable telephone terminal or data of talking speech in the use as a telephone is stored in the memory in the memory card and the data stored in the memory is reproduced when needed. In this case, processing of stored data may be the same as encode processing (compression processing) and decode processing (inverse compression processing) of the case where audio data such as music is stored. Alternatively, encode processing and decode processing having a higher compression factor suitable for speech for conversation may be conducted.

In the above described embodiment, a memory card is used as a recording medium (storage medium). Alternatively, a different recording medium may also be used. Furthermore, in the case where a memory is used as a storage medium, the memory previously built in the terminal device may be used so as to prevent the memory from being replaced.

In the above described embodiment, a portable telephone terminal using a radio telephone line is used as the communication terminal. However, the embodiment can be applied also to a radio communication terminal for radio communication system that conducts processing of sounding a similar ring tones (call tone) upon receiving a call signal from a base station.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A ring tones output method for a portable telephone terminal that conducts radio communication with another telephone station, said portable telephone terminal having a speaker incorporating a music data or speech data reproduction function and accepting a removable memory card containing music data of a musical program, said ring tones output method comprising the steps of:

storing ring tones for use in a first mode according to predetermined data included in previously prepared data for ring tones in response to an incoming call from another telephone station;

auditioning the musical program contained in the memory card using the music data reproduction function by the user listening to the musical program over the speaker;

creating a melody index of a start address and a stop address of a portion of the auditioned musical program selected by a user by first clicking an operation means at a start time of a selected portion of the musical program and next clicking the operation means at a stop time of the selected portion of the musical program;

storing the created melody index in a reproduction function section of the portable telephone terminal;

upon receiving an incoming call, checking whether the melody index has been stored;

upon determining that the melody index is present, outputting the selected portion of the auditioned musical program over the speaker in a second mode by accessing the melody index stored in the reproduction function section of said portable telephone terminal; and upon determining that the melody index is not present, outputting the stored ring tones over the speaker in the first mode.

2. A portable telephone terminal comprising:

radio communication means for conducting radio communication with another telephone station;

ring tones storage means for storing ring tones;

operation means adapted to be clicked by a user performing operations;

data storage means including a memory card storing music data of a musical program, the memory card being removably inserted in the, portable telephone terminal;

incoming call detection means for detecting an incoming call from a signal received by said radio communication means;

a speaker for sounding said stored ring tones;

data reproduction means for reproducing to the user the musical program corresponding to the music data stored in said memory card over the speaker;

musical program setting means for setting and storing a melody index representing start and stop points of a selected portion of the musical program stored in the memory card by the user first clicking the operation means at a start time of the portion of the musical program and next clicking the operation means at a stop time of the portion of the musical program reproduced over the speaker;

control means responsive to detection of the incoming call conducted by said incoming call detection means for checking said memory for the presence of said melody index and upon finding said melody index controlling said speaker to sound said selected portion of the musical program by accessing the stored melody index and causing the music data reproduction means to reproduce the selected portion of the musical program stored in the memory card, further in response to detection of the incoming call by said incoming detection means and upon not finding the presence of said melody index, said control means outputs the stored ring tones over the speaker.

3. The portable telephone terminal according to claim 2, wherein the music data stored in said memory card is data taken in the portable telephone terminal from an external source.

4. The portable telephone terminal according to claim 3, wherein the music data is taken in by reception conducted by said radio communication means.

5. The terminal according to claim 2, further comprising data conversion means for conducting predetermined conversion- processing on the music data stored in said memory card, and upon detecting that said musical program setting means has set the melody index, said control means controls said conversion means so as to conduct predetermined conversion processing on the selected portion of the musical program and conducts control so as to store resultant data in said ring tones storage means.

* * * * *

UNITED STATES PATENT AND TRADEMARK OFFICE
CERTIFICATE OF CORRECTION

| | |
|---|---|
| PATENT NO. | : 7,050,573 B2 |
| APPLICATION NO. | : 09/861789 |
| DATED | : May 23, 2006 |
| INVENTOR(S) | : Shinji Okazaki and Katsumi Hirota |

Page 1 of 1

It is certified that error appears in the above-identified patent and that said Letters Patent is hereby corrected as shown below:

Column 11, line 27, delete ",".
Column 12, line 29, delete "-".

Signed and Sealed this

Twelfth Day of December, 2006

JON W. DUDAS
*Director of the United States Patent and Trademark Office*